Nov. 7, 1933.  H. J. CRINER  1,934,621
BREAD SLICING MACHINE
Filed Sept. 22, 1930  3 Sheets-Sheet 1
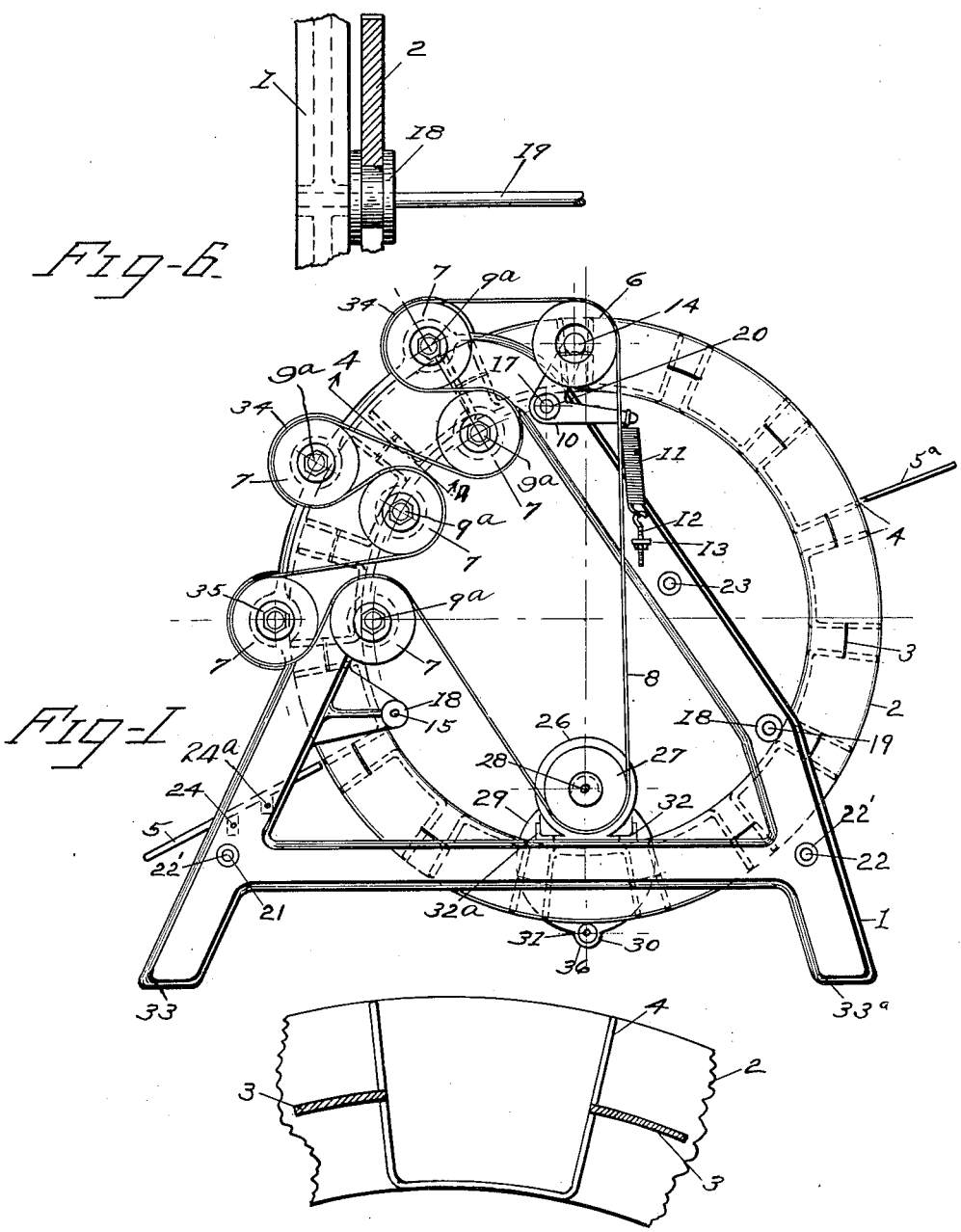

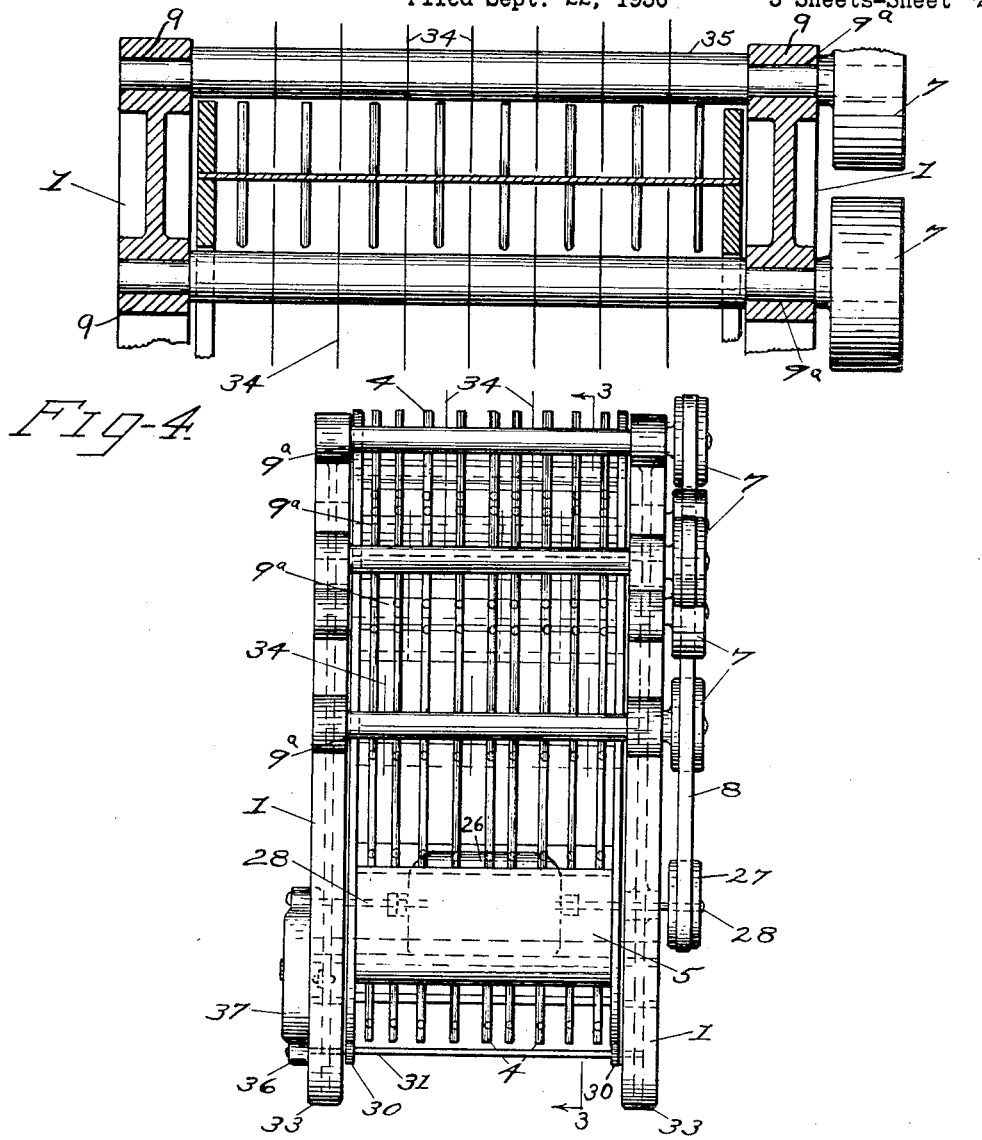

Nov. 7, 1933.  H. J. CRINER  1,934,621
BREAD SLICING MACHINE
Filed Sept. 22, 1930  3 Sheets-Sheet 3
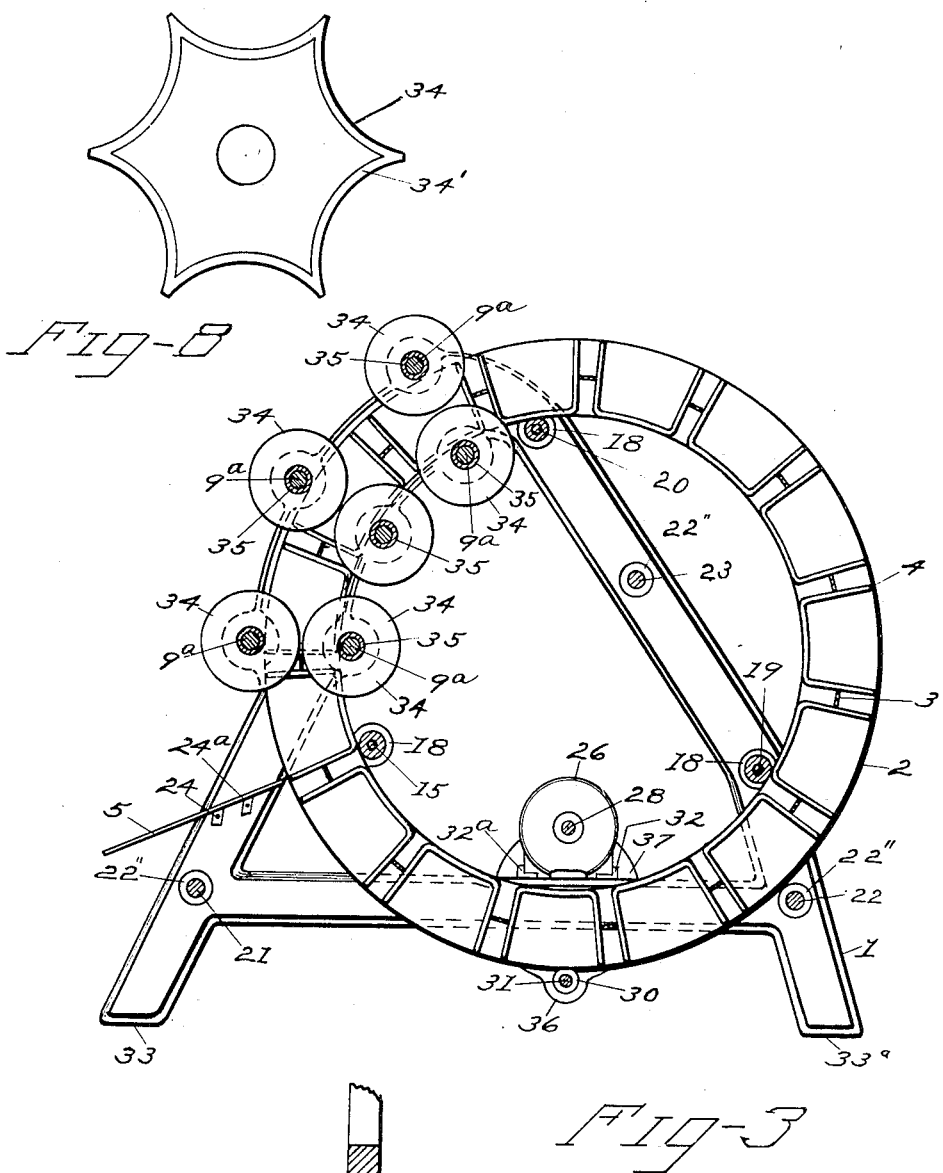
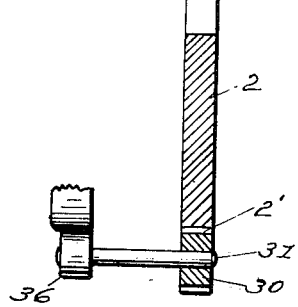
Harry J. Criner INVENTOR.
BY Curtis Bush
ATTORNEY.

Patented Nov. 7, 1933

1,934,621

UNITED STATES PATENT OFFICE 1,934,621

BREAD SLICING MACHINE

Harry J. Criner, Davenport, Iowa, assignor, by mesne assignments, to The Micro Corporation, Bettendorf, Iowa, a corporation of Delaware Application September 22, 1930
Serial No. 483,619

18 Claims. (Cl. 146—98)

My invention relates to improvements in bread slicing machines in which a plurality of opposed sets of rotary cutting blades are used to slice the bread and in which a small portion of the bread through the middle of the loaf, is left uncut.

The objects of my invention are:

1. To afford an improved arrangement of the pairs of opposed sets of cutters;

2. To provide an improved form of feeding apparatus for carrying the bread to the slicing blades and to provide means for automatically discharging the bread from the feeding apparatus;

3. To provide a form of bread slicing machine which will hold the loaves of bread sufficiently to secure them against displacement while passing through the cutting blades and which will facilitate high speed of operation.

I attain these objects by the means illustrated in the accompanying drawings, in which,—

Figure 1 is a side elevation of my device;

Figure 2 is a rear elevation;

Figure 3 is a vertical section on the line 3—3 of Figure 2;

Figure 4 is an enlarged sectional detail on the line 4—4 of Figure 1;

Figure 5 is an enlarged detail of the driving gears;

Figure 6 is an enlarged detail of one of the upper supporting and guiding rolls showing one of the drive rings, 2, in section;

Figure 7 is an enlarged detail showing a portion of one of the drive rings with the cross-bars in section;

Figure 8 is an enlarged detail of my preferred form of cutter blade.

Similar numerals refer to similar parts throughout the several views.

My machine comprises a pair of side frames, 1, with legs, 33 and 33a, and cross-tie-rods, 21, 22 and 23, uniting same.

Bosses, 22'', are formed upon the inner faces of the side frame members, 1, to which the tie-rods, 21, 22 and 23 extend and the tie-rods are secured to the frames by nuts, 22'.

Bearings, 9, are formed in the side frames which support the cutter shafts, 9a, which extend laterally across the machine from one side frame to the other. On one of the outer ends of the cutter shafts, 9a, I mount belt-driven pulleys, 7.

Upon the cutter shafts intermediate the side frames, I mount a plurality of cutting blades, 34, which may be in any desired form, but which I prefer to construct in the form shown in Figure 8—that is with concave scallops in their outer edges and sharpened as at 34'.

Roll shafts, 15, 19 and 20, extend transversely of the machine and are mounted in suitable bearings in the side frames, 1. Upon each of these shafts at either end are mounted supporting and guiding rolls, 18, which are in the form of channeled wheels, as shown in Figure 6.

Drive rings, 2, which are preferably formed of broad, flat, annular bands of metal, have their inner edges secured in the channels of the rolls, 18, and are formed to fit in the channels closely enough to prevent unnecessary wabbling, but loosely enough to allow them to run freely therein.

The outer edges of the drive rings, 2, are provided with gear teeth, 2', which mesh with a drive gear wheel, 30, mounted upon one end of the drive shaft, 31, the opposite end of which is mounted in a gear box, 36, and is driven by gears contained within the gear box. The gears in the gear box are in turn driven by an electric or other motor, 26, through a motor shaft, 28, the motor housing being secured upon cross-members of the frame, 1.

In the drawings I have shown both of the drive rings driven by the drive gears, 30, and a single gear box and motor to drive it. The second drive gear may be omitted and the feeding devices driven by a single gear.

A plurality of transverse bars, 3, comprising thin bars of metal of sufficient width to insure the necessary rigidity, extend across from one drive ring to the opposite drive ring and are rigidly united to the drive rings.

A plurality of wires, 4, are firmly united to adjacent transverse or cross-bars, 3, with the ends of the wires pointing outwardly and with the intermediate portion forming a rest or support for the bread as it passes to the first pair of cutters.

The number of wires, 4, may be varied to suit the requirements of any particular case, but I prefer to attach to each adjacent pair of cross-bars, 3, as many wires, 4, as there are pairs of cutter blades, plus one, so that as the bread passes through the cutters, each slice of bread will be carried by one of the wires, 4.

These wires should be formed of sufficient size and stiffness to afford firm support for the bread from the time it is fed into the machine at the front or right of the machine as shown in Figure 1, until it leaves the machine at the rear thereof.

For convenience, I refer to each series of wires, 4, connecting any given pair of adjacent cross-bars, 3, as a basket, or receptacle.

A delivery table, 5, is mounted at the rear of the machine upon angle-irons, 24 and 24a, which are suitably secured to the side frames, 1. The bread may be placed in the basket manually at the front of the machine or an inclined feeding table, 5a, may be provided with sufficient slope to feed the bread into each basket as it passes the feeding table.

A drive belt pulley, 27, is mounted upon one end of the motor shaft, 28, and a belt, 8, passes around this drive pulley, 27, and around the pulleys, 7, in such a manner as to drive the cutter shafts, 9a, of each pair of shfts in opposite directions.

An idler pulley, 6, is mounted upon a shaft or pinion, 14, which is secured in one end of a bell crank lever, 10, fulcrumed upon a pivot, 20, which is suitably secured in one of the side frames.

The opposite end of the bell crank lever, 10, is connected to one end of a tension coiled spring, 11, the opposite end of which is attached to a hook, 12, suitably secured to a boss, 13, formed integral with the side frame.

Each cutter shaft carries a plurality of blades equal in number to one-third of the cuts to be made in the bread, separated by spacers. The cutters on each shaft of a given pair are mounted in juxtaposition or opposite the corresponding blades on the other shaft of that pair. The cutters or blades are of such diameter or length as to leave sufficient space between them for the cross-bars, 3, to pass between the blades without hitting them and without coming in contact therewith.

The blades upon each pair of cutter shafts are staggered with relation to the blades upon the other pairs of cutter shafts. While I have shown three pairs of cutter shafts, it is obvious that the number may be either increased or diminished without departing from the spirit of my invention. The blades, 34, are preferably made of very thin metal and bread of some kinds and in some conditions can be readily sliced into as many slices as necessary by the opposed blades upon a single pair of shafts, but other kinds of bread and bread in other conditions, cannot be sliced by the use of a single pair of shafts because of the tendency of the bread to pack or jam and to crush when a large number of blades are passing through a given loaf at the same time. In such cases, two or three sets of cutters will usually be sufficient to avoid crushing or jamming, but additional pairs can be used if desired.

In the operation of my machine, the motor is started up and drives the cutter shafts, 9a, at the same time the gears, 30, set the rings, 2, in motion.

The bread may then be placed in the baskets at the front of the machine either manually or by gravity feed from the table, 5a, or other mechanical means. As the loaves are successively placed in the baskets, they are carried upward and around to the cutting blades. The cutting blades may be arranged to turn in either direction, but I prefer to have the adjacent edges of each pair of blades turning toward the bread as it approaches. The bread will then be resting upon the bottom of each basket and the rear side of the basket will form a detent or support to keep the bread from being thrown out of the basket by the cutters.

The cutter blades are preferably driven at a high speed and the bread travels relatively slowly in passing to the cutters, but the speed ratios may be varied by varying the sizes of the pulleys and gears as desired.

It is apparent that my arrangement of the baskets puts the entire basket assembly in a cylindrical form and that to rigidly connect the opposite sides of the wires comprising each basket to the adjacent cross-bars, will give the cylinder a considerable degree of stability independent of the annular side plates, so that the fastening of the cross-bars to the side plates is not essential to the operation of my invention.

The ends of the cross-bars may be supported and driven in other ways without departing from the spirit of my invention.

I prefer to arrange the inner and outer shafts in concentric arcs having a common center with the basket-cylinder and as so formed, the cross-bars must be held in cylindrical position, but it is only essential that the cross-bars be held with sufficient firmness to prevent contact with the cutters as the cross-bars pass between the cutting blades, and accordingly, any form of assembly may be used which will permit convenient and rapid loading of the bread onto the carrier and hold it in proper position as it passes through the cutters.

It is also obvious that the baskets or bread receptacles need not be made of separate rods or wires, but a sheet of metal may be stamped out to the proper shape and the bottom and sides may be slotted so as to leave the slotted side members united by small isthmuses or connecting bars of the original metal. The separate baskets after being so slotted, can then be joined together in any suitable manner.

The invention shown, described and claimed herein is directed to improvements on the inventions shown in my co-pending applications Serial No. 423,669, filed January 27, 1930; Serial No. 424,849, filed January 31, 1930; and Serial No. 462,559, filed June 20, 1930; applications Serial Nos. 423,669 and 462,559 being directed to opposed rotary cutters and feeding means for moving loaves of bread to, through and beyond the cutters, and application Serial No. 424,849 being directed to the arrangement of the cutters carried by opposed pairs of cutter shafts.

I claim:

1. A rotary bread slicing machine comprising a pair of side frames, cross-ties uniting the side frames, a pair of inner and outer cutter shafts revolvably mounted in the side frames in spaced relation to each other, opposed rotary cutters or blades in common planes mounted upon the cutter shafts of such length as to leave a small clearance between their opposed edges as they revolve, and an open cylindrical carrier revolvably mounted between the side frames and traveling between the inner and outer shafts adapted to receive unsliced loaves of bread successively and to carry them through between the cutters.

2. A rotary bread slicing machine comprising a pair of side frames, cross-ties uniting the side frames, a pair of inner and outer cutter shafts revolvably mounted in the side frames in spaced relation to each other, opposed rotary cutters or blades mounted upon the cutter shafts of such length as to leave a small clearance between their outer edges as they revolve, and a plurality of open wire receptacles secured in cylindrical arrangement revolvably mounted between the side frames and traveling between the inner and outer shafts and adapted to receive unsliced loaves of bread successively and to carry them through between the cutters.

3. A rotary bread slicing machine comprising a pair of side frames, cross-ties uniting the side frames, a plurality of pairs of inner and outer cutter shafts revolvably mounted in the side frames in spaced relation to each other, the inner and outer shafts being arranged in concentric arcs, opposed rotary cutters or blades mounted upon the cutter shafts of such length as to leave a small clearance between their opposed edges as they revolve, a carrier adapted to carry the material to and through the opposed sets of cutters and comprising a pair of annular side plates, each having a relatively large central opening therein a plurality of thin cross-bars united thereto together with a plurality of wires or rods secured to successive cross-bars and bent to form open baskets or receptacles between the cross-bars, a plurality of pivots secured to the side frames and extending inwardly therefrom, supporting and guiding wheels revolvably mounted upon the pivots and having their peripheries channeled to receive and guide the annular plates the inner cutter shafts being located within the central openings of the annular plates and extending transversely through them, the outer cutter shafts being mounted outside of the annular plates and the crossbars arranged to travel between the opposed cutters at each rotation of the annular plates, and means to rotate the carrier and the cutter shafts simultaneously.

4. A rotary bread slicing machine comprising a pair of side frames, cross-ties uniting the side frames, a plurality of pairs of inner and outer cutter shafts revolvably mounted in the side frames in spaced relation to each other, the inner shafts being located within the carrier hereinafter specified and the outer shafts being located outside thereof and the inner and outer shafts being arranged in concentric arcs, opposed rotary cutters or blades mounted upon the cutter shafts of such length as to leave a small clearance between their opposed edges as they revolve, and an open cylindrical carrier revolvably mounted between the side frames adapted to receive unsliced loaves of bread successively and to carry them to and through the cutters.

5. A rotary bread slicing machine comprising a pair of side frames, cross-ties uniting the side frames, a plurality of pairs of inner and outer cutter shafts revolvably mounted in the side frames in spaced relation to each other, the inner and outer shafts being arranged in concentric arcs, opposed rotary cutters or blades mounted upon the cutter shafts of such length as to leave a small clearance between their opposed edges as they revolve, and a plurality of open wire receptacles secured in cylindrical arrangement revolvably mounted between the side frames arranged to travel between the inner and outer shafts and adapted to receive unsliced loaves of bread successively and to carry them through between the cutters.

6. In a bread slicing machine having opposed sets of rotatable cutting blades mounted therein, a bread basket comprising continuously slotted sides and bottom and having the side members of each side respectively firmly connected by thin cross-members, and means for passing the basket through between the opposed sets of blades.

7. In a bread slicing machine having opposed sets of rotatable cutting blades mounted therein, a carrier comprising a plurality of baskets comprising a plurality of small rods spaced apart and bent in a flared U-shape with the bottom squared, and the side members on the respective sides of the baskets united by cross-members, arranged and secured together in cylindrical form, means for rotating the carrier and for passing the baskets through between the opposed sets of blades.

8. In a bread slicing machine having opposed sets of rotatable cutting blades mounted therein, a carrier comprising a plurality of baskets formed of a plurality of small rods spaced apart and bent in a flared U-shape with the bottom squared, and the side members on the respective sides of the baskets united by cross-members, united together in a continuous series, means for driving the carrier and for passing the baskets through between the opposed sets of blades.

9. In a bread slicing machine, the combination with a frame, of a spaced pair of cutter shafts mounted therein, opposed cutter blades mounted at corresponding intervals upon the shafts and with a small clearance between adjacent edges of each opposed pair of cutters, a bread carrier comprising a plurality of baskets formed with a plurality of small rods spaced apart and bent in a flared U-shape with the bottom squared, and the side members on the respective sides of the baskets united by thin cross-members, arranged and connected together in a continuous series, and means for driving the carrier so as to cause the baskets to pass successively between the cutter shafts.

10. In a bread slicing machine, the combination with a frame, of a plurality of spaced pairs of cutter shafts mounted therein, opposed cutter blades mounted at corresponding intervals upon the shafts and with a small clearance between adjacent edges of each opposed pair of cutters, a bread carrier comprising a plurality of baskets formed with a plurality of small rods spaced apart and bent in a flared U-shape with the bottom squared, and the side members on the respective sides of the baskets united by thin cross-members, arranged and connected together in a continuous series, and means for driving the carrier so as to cause the baskets to pass successively between the cutter shafts.

11. A rotary bread slicing machine comprising a pair of side frames, cross-ties uniting the side frames, a plurality of pairs of inner and outer cutter shafts revolvably mounted in the side frames in spaced relation to each other, the inner shafts being located within the carrier hereinafter specified and the outer shafts being located outside thereof, opposed rotary cutters or blades mounted upon the cutter shafts of such size as to leave a small clearance between their opposed edges as they revolve, and an open cylindrical carrier revolvably mounted between the side frames adapted to receive unsliced loaves of bread successively and to carry them to and through the cutters.

12. A rotary bread slicing machine comprising a pair of side frames, cross-ties uniting the side frames, a cutter shaft extending transversely of the side frames and revolvably mounted therein approximately at the outer edges of the annular plates hereinafter mentioned, a corresponding cutter shaft extending transversely of the side frames and revolvably mounted therein approximately at the inner edges of the annular plates hereinafter mentioned, opposed rotary cutters or blades mounted upon the cutter shafts of such length as to leave a small clearance between their opposed edges as they revolve, said cutters being arranged in common planes, a carrier adapted to carry material to be sliced to and through the opposed cutters and comprising a pair of annular side plates, each having a relatively large central opening, and a plurality of thin crossbars united thereto together with a plurality of wires or rods secured to successive pairs of crossbars and bent to form open baskets or receptacles between such crossbars, a plurality of substantially evenly spaced pivots secured to the inner faces of the side frames and extending inwardly therefrom into the central openings in the annular plates and in proximity to the inner edges thereof, supporting and guiding wheels revolvably mounted upon the pivots and having their peripheries channeled to receive and guide the inner edges of the annular plates, the supporting and guiding wheels and the annular plates and the crossbars being so located and proportioned relatively to the cutter shafts and blades as to cause the crossbars to pass between the opposed rotary cutters with each complete revolution of the annular plates, and means to rotate the carrier and the cutter shafts simultaneously.

13. A rotary bread slicing machine comprising a pair of side frames, cross-ties uniting the side frames, a pair of inner and outer cutter shafts revolvably mounted in the side frames in spaced relation to each other, opposed rotary cutters or blades mounted upon the cutter shafts of such size as to leave a small clearance between their opposed edges as they revolve, a revolving carrier comprising a plurality of open wire receptacles secured together at spaced intervals in cylindrical form, thin crossbars uniting the wires in each receptacle, and a pair of annular plates having relatively large central openings therein to which plates the opposite ends of the crossbars are united respectively, the inner cutter shaft being located within the central openings of the annular plates and extending transversely through them, the outer cutter shaft being mounted outside of the annular plates and the crossbars arranged to travel between the opposed cutters at each rotation of the annular plates, and means for operating the carrier between the inner and outer shafts and for driving the cutter shafts simultaneously.

14. A rotary bread slicing machine comprising a pair of side frames, cross-ties uniting the side frames, a pair of inner and outer cutter shafts revolvably mounted in the side frames in spaced relation to each other, opposed rotary cutters or blades mounted upon the cutter shafts of such size to leave a small clearance between their opposed edges as they revolve, a revolving carrier comprising a plurality of open wire receptacles spaced apart upon a suitable support, such supports consisting of annular plates having relatively large central openings therein, thin crossbars uniting the wires in each receptacle and having their opposite ends united to the respective annular plates, the crossbars being adapted to pass between the opposed blades on the shafts as the carrier revolves, the wires forming the baskets being adapted to pass between the shafts and to clear the cutting blades in so doing, the inner cutter shaft being located within the central openings of the annular plates and extending transversely through them, the outer cutter shaft being mounted outside of the annular plates and the crossbars arranged to travel between the opposed cutters at each rotation of the annular plates, and means for driving the carrier and the cutter shafts simultaneously.

15. In a bread slicing machine the combination with opposed sets of rotatable cutters mounted therein, of a bread receptacle comprising a plurality of small rods spaced apart and bent in a flared U-shape with the bottom squared, and the side members of the respective sides of the basket uniformly united substantially midway thereof by cross-members, mechanical means for passing the receptacle through the sets of cutters with the cross-members passing between them whereby the bread is cut from opposite sides, and means for driving the cutters and the receptacle simultaneously.

16. In a bread slicing machine, the combination with opposed sets of rotatable cutting blades mounted therein, of a bread receptacle comprising a plurality of small rods spaced apart and bent in a flared U-shape with the bottom squared, and the side members on the respective sides of the basket uniformly united substantially midway thereof and held in fixed relative position by cross-members, mechanical means for passing the receptacle through the opposed sets of blades with the cross-members passing between them whereby the bread may be cut from opposite sides, and means for driving the cutters and the receptacle simultaneously.

17. In a bread slicing machine, the combination with opposed sets of rotatably cutting blades mounted therein, of a bread receptacle comprising a plurality of small rods bent substantially to form three sides of a square and having the side members on the respective sides of the receptacle united by narrow cross-members substantially midway thereof, mechanical means for passing the receptacle through the opposed sets of blades, with the cross-members passing between the opposed cutters whereby the bread is held in a position to be cut from opposite sides, and means for driving the cutters and the receptacle simultaneously.

18. A slicing machine comprising spaced side frames, a pair of spaced rotary cutter shafts, spaced cutters fixed to each of said shafts, each cutter of one shaft being disposed in the plane of a cutter of the other shaft and being spaced therefrom, annular rotatable conveyor frames spaced from each other and being rotatable between said cutter shafts, means for rotating said cutter shafts, means for rotating said annular conveyor frames, and spaced means carried by said conveyor frames for receiving unsliced articles and progressively carrying them to and through said cutters during rotation thereof.

HARRY J. CRINER.